United States Patent [19]

Yamawaki

[11] Patent Number: 4,943,615

[45] Date of Patent: Jul. 24, 1990

[54] OLEFIN COPOLYMER COMPOSITION

[75] Inventor: Takashi Yamawaki, Ichihara, Japan

[73] Assignees: Idemitsu Petrochemical Company Limited, Tokyo, Japan; Neste Oy, Keilaniemi, Finland

[21] Appl. No.: 236,958

[22] Filed: Aug. 26, 1988

[30] Foreign Application Priority Data

Aug. 29, 1987 [JP] Japan ................... 62-215846

[51] Int. Cl.$^5$ .................. C08L 23/20; C08L 23/08
[52] U.S. Cl. ...................... 525/240; 428/516
[58] Field of Search .......................... 525/240

[56] References Cited

U.S. PATENT DOCUMENTS

| 4,600,762 | 7/1986 | Fukui et al. | 526/348.6 |
| 4,642,269 | 2/1987 | Kohyama et al. | 525/240 |
| 4,734,328 | 3/1988 | Kohyama et al. | 525/240 |
| 4,766,178 | 8/1988 | Hwo | 525/240 |

*Primary Examiner*—Carman J. Seccuro

*Attorney, Agent, or Firm*—Armstrong, Nikaido, Marmelstein, Kubovcik & Murray

[57] ABSTRACT

The present invention relates to an olefin copolymer composition, which olefin copolymer composition contains (A) 25 to 97 wt. % of a propylene copolymer, and (B) 75 to 3 wt. % of a butene-1 copolymer having a content of α-olefin unit with 2 to 8 carbon atoms of 1 to 35 mol %, an intrinsic viscosity of 0.9 to 7.2 dl/g measured in decalin heated to 150° C., a value of weight-average molecular weight/number-average molecular weight of 4 to 15, a temperature difference of 2° to 40° C. between the highest value and the lowest value of the melting point measured by the differential scanning calorimetric analysis, and a α-olefin block property of 0.015 or lower measured by the nuclear magnetic resonance spectral analysis, can provide molded items excellent, for example, in heat-sealing properties, transparency, blocking resistance, and surface gloss, and is good in processability.

14 Claims, No Drawings

OLEFIN COPOLYMER COMPOSITION

BACKGROUND OF THE INVENTION (1) Field of the Invention

The present invention relates to a novel olefin copolymer composition. More particularly, the present invention relates to an olefin copolymer composition which is suitable as a material for single-layer films, laminated films, and the like, can provide molded items excellent, for example, in heat-sealing properties, transparency, blocking resistance, and surface gloss, and is good in processability.

(2) Description of the Related Art

Polypropylene resins have heretofore been widely used, for example, in the field of films by virtue of their excellent mechanical properties such as stiffness and impact strength as well as their excellent optical properties. However, these polypropylene resins have a defect that the film formed therefrom alone has a high heat-sealing temperature.

In view of this, there was proposed a composition prepared by blending a polypropylene resin with a butene-1 copolymer in order to improve the heat-sealing properties of polypropylene film (Japanese Patent Laid-Open Nos. 108646/1986, and 108647/1986). However, this composition has a defect that the transparency of the film prepared therefrom lowers because the butene-1 copolymer used for the composition which is prepared by solution polymerization using a catalyst carried on magnesium chloride has a narrow molecular weight distribution, and is not enough high in processability.

The butene-1 copolymer obtained using titanium trichloride as a catalyst is low in randomness and poor in transparency, and therefore the polypropylene type film obtained from the composition prepared by blending it is inevitably not high enough in transparency.

SUMMARY OF THE INVENTION

Under these circumstances, the present invention has been accomplished with the aim of providing an olefin copolymer composition which is suitable as a material for single-layer films, laminated films, and the like, and which can provide molded items excellent, for example, in heat-sealing properties, transparency, blocking resistance, and surface gloss, and is good in processability.

The inventors have studied intensively to develop an olefin copolymer composition having desirable properties as mentioned above, and have found that a composition containing a propylene copolymer and a specified butene-1 copolymer in a prescribed ratio is suitable therefor, leading to the completion of the Present invention.

Therefore, the present invention provides an olefin copolymer composition, which olefin copolymer composition contains (A) 25 to 97 wt. % of a propylene copolymer, and (B) 75 to 3 wt. % of a butene-1 copolymer having a content of α-olefin unit with 2 to 8 carbon atoms of 1 to 35 mol %, an intrinsic viscosity of 0.9 to 7.2 d±/g, a value of weight-average molecular weight-/number-average molecular weight of 4 to 15, a temperature difference of 2° to 40° C. between the highest value and the lowest value of the melting point measured by the differential scanning calorimetric analysis, and an α-olefin block property of 0.015 or lower measured by the nuclear magnetic resonance spectral analysis.

DESCRIPTION OF THE PREFERRED EMBODIMENT

As a preferable example of the propylene copolymer used as component (A) in the present composition, can be mentioned a crystalline random copolymer prepared by copolymerization of propylene as major component with other α-olefin. The propylene unit content and the other α-olefin unit content of this copolymer are generally selected within the range of 90 to 99.5 wt. %, and the range of 10 to 0.5 wt. %, respectively, preferably within the range of 92 to 99 wt. %, and the range of 8 to 1 wt. %, respectively. Examples of the other α-olefin to be copolymerized with propylene include ethylene, butene-1, pentene -1, hexene-1, and 4-methylpentene. These α-olefins may be used alone or in combination to be copolymerized with propylene. Ethylene is preferably used as the other α-olefin that is used as a comonomer. The propylene copolymer suitably has a melt index of 0.1 to 25 g/10 min, preferably of 0.5 to 20 g/min.

In the present composition, a butene-1 copolymer is used as component (B). It is required that this butene-1 copolymer contains butene-1 units, and o-olefin units each having 2 to 8 carbon atoms, and the content of the α-olefin unit is in the range of 1 to 35 mol %. If the content of α-olefin unit is lower than 1 mol %, the decrease in the heat-sealing temperature of the film obtained from the resulting composition is not enough, whereas if the content of o-olefin unit exceeds 35 mol %, the film obtained from the resulting composition tends to have poor surface characteristics including stickiness. The content of the α-olefin unit is preferably selected within the range of 3 to 30 mol %.

As monomers constituting the α-olefin unit with 2 to 8 carbon atoms preferably use can be made of, for example, ethylene, propylene, and hexene-1. These α-olefin monomers may be used alone or in combination to be copolymerized with butene-1.

The intrinsic viscosity $[\eta]$ measured in a decalin solution at 135° C. of the butene-1 copolymer of the present invention is in the range of 0.9 to 7.2 dl/g. This intrinsic viscosity $[\eta]$ has an influence mainly on the moldability and the mechanical strength of the butene-1 copolymer composition.

If intrinsic viscosity $[\eta]$ is lower than 0.9 dl/g, then, in case the butene-1 copolymer composition is molded into a film, the mechanical strength, or especially, the impact strength of the film lower. When it is higher than 7.2 dl/g, the moldability also lowers. In particular, in the present invention, by keeping the intrinsic viscosity $[\eta]$ in the range of 1.0 to 4.0 dl/g, the mechanical characteristics of the butene-1 copolymer composition become very good and the moldability of the film is also improved.

The molecular weight distribution, that is, the ratio (Mw/Mn) of the weight-average molecular weight (Mw) and the number-average molecular weight (Mn) is in the range of 4 to 15.

This molecular weight distribution gives transparency to the molded film obtained, and simultaneously also influences the moldability and the mechanical strength of the molded film.

In the butene-1 copolymer obtained by the conventional method, the width of this molecular weight distribution has a tendency to become narrow, so that a molded body having sufficient moldability is difficult to obtain and moreover, in case it is molded into a film-like shape, the transparency of the film was generally insufficient.

That is, the butene-1 copolymer having the above-described molecular weight distribution, which does not reach 4, shows insufficient moldability for a film of butene-1 copolymer, and moreover, the transparency of the molded film deteriorates. When the above-described molecular weight distribution is wider than 15, the transparency of the film made of the butene-1 copolymer composition also becomes low.

In particular, in the present invention, it is preferred that the molecular weight distribution be in the range of 4 to 10. The butene-1 copolymer composition, which is in this range has good moldability and further, the mechanical characteristics and transparency of the film obtained by molding the butene-1 copolymer composition are especially good.

When the butene-1 copolymer as component (B) mentioned above is analyzed with a differential scanning calorimetric analyzer, two endothermic peaks respectively showing the highest melting point and the lowest melting point thereof are obtained. Of them, generally, the highest melting point is within the range of 70° to 110° C. In the present invention, when the temperature of the above-mentioned copolymer which has been dried is elevated from 0° to 200° C. at a heating rate of 10° C./min to measure the endothermic peaks, the peak appearing on the higher temperature side is the highest melting point, and the peak or the shoulder appearing on the lower temperature side is the lowest melting point.

It is required that the difference between the highest melting point and the lowest melting point of the butene-1 copolymer used in the composition of the present invention (the temperature difference between the maximum value and the minimum value of the melting point) which is measured by a differential scanning calorimetric analyzer is within the range of 2° to 40° C., preferably 5° to 30° C. This temperature difference affects Particularly the processability and the temperature at which the molded items in the form of film are laid together and heated under pressure to be bonded (heat-sealing temperature).

More specifically, on the one hand if the above-mentioned temperature difference is smaller than 2° C., the heat-sealing temperature becomes high and the film formed from the resulting composition lowers in heat-sealing properties, and on the other hand if the temperature difference exceeds 40° C., the copolymer becomes sticky and lowers in molding performance. Particularly if the highest melting point is lower than 70° C., it sometimes happens that the copolymer becomes sticky at normal temperatures and is not allowed to be used as a material for molded items at normal temperatures. On the other hand, if the highest melting point is 110° C. or over, the heat-sealing temperature is too high to allow good heat sealing.

Further, it is preferable that the melting heat quantity of the above-mentioned copolymer measured by the differential scanning calorimetric analysis (which is determined by the straight line connecting the base lines of the peaks or the shoulders appearing in the differential scanning calorimetric analysis) is in the range of 2 to 25 cal/g. On the one hand, when the melting heat quantity is lower than 2 cal/g, the copolymer is inclined to become sticky in some cases, and on the other hand, when the melting heat quantity is higher than 25 cal/g, the molded item in the form of film lowers in transparency in some cases.

Further, it is necessary that the α-olefin block property of the above-mentioned butene-1 copolymer is 0.015 or lower when measured by the nuclear magnetic resonance spectral analysis. The block property affects the heat-sealing temperature of the film obtained from the composition. The lower the value of the block property, the larger the effect on lowering the heat-sealing temperature. If the value of the block property exceeds 0.015, the effect on lowering the heat-sealing temperature of the film formed from the present composition is not sufficiently exhibited. The preferable value of the block property is selected suitably depending on the type of the α-olefin to be copolymerized with butene-1.

As to the blocking properties (X) of the α-olefin unit, the $^{13}$C-NMR of the butene-1 copolymer is measured, and each said is identified with the results of the measurement utilizing the method described in "Macromolecules" 15, 353, 1982). Thus, the measurement of the blocking properties (X) the α-olefin in the main chain of the butene-1 copolymer n be carried out from the following equation [1].

$$X = I/O \qquad [1]$$

where, in the Eq. [1], I is the block polymerization portion of the chain of the α-olefin unit in the butene-1 copolymer, and is normally represented by the following equation.

In case the α-olefin unit is a propylene unit, I can be presented by the following equation.

$$I = \frac{I_{pp}}{I_{PB}}$$

In addition, 0 in the above-described Eq. [1] is the percentage content of the α-olefin unit in the butene-1 polymer. When the α-olefin unit is a propylene unit, 0 is he percentage content P of the propylene unit. The percentage of content P of the propylene unit is usually represented by the following equation.

$$P \text{ (mol \%)} = \frac{I_{pp} + I_{PB}/2}{I_{pp} + I_{PB} + I_{BB}} \times 100$$

But, in the above-described equation, $I_{pp}$ shows the peak strength of the sequence of the propylene chain of $I_{pppp} + I_{PPPB} + I_{BPPB}$, and $I_{PB}$ shows the peak strength of the sequence of the propylene-butene-1 chain of $I_{BPBP} + I_{BPBB} + I_{PPBB}$, and $I_{BB}$ shows the peak strength of the sequence of the butene-1-chain of $I_{BBBB} + I_{PBBB} + I_{PBBP}$.

When the butene-1 copolymer in the present invention is a copolymer of butene-1 and propylene, the blocking property (X) of the propylene unit in the butene-1 copolymer is less than 0.01. When the blocking property (X) of propylene is less than 0.01, the amount the heat seal temperature of the film made of butene-1 copolymer reduces can be made much larger.

In addition, in case the butene-1 copolymer is a copolymer of ethylene and butene-1, I in the above-described equation [1] is the block polymerization proportion of the chain of the ethylene units in the butene-1 copolymer, this block polymerization proportion of the chain of ethylene units is usually represented by the following equation:

$$I = \frac{I_{EEE}}{I_{PBE} + I_{EBE} + I_{BEB}}$$

Moreover, 0 which defines the blocking property (X) of α-olefin is the percentage content E of the ethylene units in the butene-1 copolymer, when the α-olefin is ethylene. This percentage content of ethylene units is usually represented by the following equation:

$$E \text{ (mol \%)} = \frac{I_{EEE}/2 + I_{EBE} + I_{EEB}}{I_{BBB} + I_{BBE} + I_{BEB} + I_{EEE}/2 + I_{EBE} + I_{EEB}} \times 100$$

But, in the above-described equation, $I_{EEE}$ represents the existing mol number of the chain of ethylene unit-ethylene unit - ethylene unit in the butene-1 copolymer, and in the following, in the same way as above, $I_{BBE}$, $I_{EBE}$, and $I_{BEB}$ also, show the unit in case the three monomer units in the copolymer are noticed and taken as one unit.

When the butene-1 copolymer in the present invention s a copolymer of butene-1 and ethylene, the blocking property (X) of the ethylene unit in the butene-1 copolymer should be less than 0.015. This value is also preferable hen it is lower, so that the most preferable value is zero. When the locking property (X) of the ethylene unit is less than 0.015. the lowering of the heat sealing temperature of the butene-1 copolymer film can be made much larger.

Incidently, identification can be carried out by measuring the strength of the methylene peak appearing in the region of 48 to 39 ppm obtained in the measurement of 13C-NMR by utilizing the literature of J. Polym, Sci. Phys. Fd. 21,573, (1983).

Further, when the butene-1 copolymer is a copolymer of butene-1 with hexene-1, I in the above-mentioned formula(I) is a block polymerization proportion of a hexene-1 unit chain in the Generally, this block polymerization proportion of a hexene-1 unit chain is represented by the following formula:

$$I = \frac{I_{CH2(HH)}}{I_{CH2(BH)}}$$

wherein $I_{CH2(HH)}$ stands for the intensity of —CH$_2$— belonging to the main chain of separately prepared polyhexene that is measured from the nuclear magnetic resonance spectrum, and $I_{CH2(BH)}$ stands for the intensity of —CH$_2$— belonging to the main chain of the butene-hexene chain or the hexene-butene chain.

O defining the block property (X) of an α-olefin is the hexene-1 unit content H in the butene-1 copolymer when the α-olefin unit is a hexene-1 unit. The hexene-1 unit content H is generally represented by the following formula:

$$H \text{ (mol \%)} = \frac{I_{Br(H)}}{I_{Br(B)} + I_{Br(H)}} \times 100$$

wherein $I_{Br(H)}$ stands for the intensity of all the sequences including the hexene-1, for example the intensity of —H—H—H—, —B—H—H—, —B—H—B—, etc. if a hexene-1 unit is represented by "H" and a butene-1 unit is represented by "B," IBr(B) stands for the intensity of all the sequences including the butene-1 unit, and for example the intensity of —B—B—B—, —B—B—H—, —H—B—H—, etc.

When the butene-1 copolymer is a copolymer of butene-1 with hexene-1, the block property of the hexene-1 in the copolymer is preferably 0.005 or below.

Further, it is preferable that the butene-1 copolymer is one having a content of matter soluble in boiling diethyl ether within the range of from 1 to 45 wt. %. In general, the solubility in boiling diethyl ether tends to lower as the degree of polymerization of the copolymer is higher or as the crystallinity of the copolymer is higher. When the soluble matter content is less than 1 wt. %, the transparency of the film obtained from the composition is low in some cases, while if the soluble matter content exceeds 45 wt. %, a fear arises that the film formed from the composition becomes sticky, which is unfavorable.

As the butene-1 copolymer comprising component (B) in the present composition, use can be made of ones having the above-mentioned composition and physical properties, and the composition and the physical properties of the copolymer are appropriately chosen within the above-mentioned ranges depending on the type of the α-olefin to be copolymerized with butene-1.

Examples of the butene-1 copolymer include ethylene/butene-1 copolymers, propylene/butene-1 copolymers, and hexene-1/butene-1 copolymers. Preferably the above-mentioned ethylene/butene-1 copolymers are ones having an ethylene unit content of 1 to 15 mol %, an intrinsic viscosity of 0.9 to 7.0 dl/g, a value of weight-average molecular weight/number-average molecular weight of 4 to 15, a temperature difference of 2° to 40° C. between the highest value and the lowest value of the melting point measured by the differential scanning calorimetric analysis, an ethylene block property of 0.015 or lower measured in the above-mentioned manner, and a content of matter soluble in boiling diethyl ether of 3 to 25 wt. %.

Further, preferably the propylene/butene-1 copolymers are ones having a propylene unit content of 1 to 35 mol %, an intrinsic viscosity of 0.9 to 7.2 dl/g, a value of weight-average molecular weight/number-average molecular weight of 4 to 15, a temperature difference of 2° to 40° C. between the highest value and the lowest value of the melting point measured by the differential scanning calorimetric analysis, a propylene block Property of 0.01 or lower measured in the above-mentioned manner, and a content of matter soluble in boiling diethyl ether of 1 to 45 wt. %.

Further, preferably the copolymers of hexene-1 with butene-1 are ones having a hexene-1 unit content of 1 to 20 mol %, an intrinsic viscosity of 0.9 to 7.2 dl/g, a value of weight-average molecular weight/number-average molecular weight of 4 to 15, a temperature difference of 2° to 40° C. between the highest value and the lowest value of the melting point measured by the differential scanning calorimetric analysis, a hexene-1 block property of 0.005 or lower measured in the above-mentioned manner, and a content of matter soluble in boiling diethyl ether of 3 to 30 wt. %.

The butene-1 copolymer of the present invention can be readily produced using, for example, as a catalyst, a solid catalyst component obtained from a magnesium compound shown by the general formula MgR¹R²,
Mg(OR¹)mXn (where R₁ and R₂ is the formula are alkyl groups having carbon numbers of 1 to 20, and may be the same or different, and X represents halogen atom and m satisfies 0≦m≦2, and n satisfies 0≦n≦2.), an organic aluminium compound and a specified electron donor compound, to make α-olefines, and butene-1 react in the gas phase.

Concretely, in the production technology described in the specifications of the Japanese Patent Application No. 144093/86, No. 196265/86, No. 196266/86 and No. 196722/86, by establishing the production conditions experimentally with the above-described characteristics of the copolymer of the present invention as a yard stick, the butene-1 copolymer can be produced.

In the following, an explanation is given of the method for producing the butene-1 copolymer of the present invention along the method described in the Specification of the Japanese Patent Application No. 196266/86, but, the butene-1 copolymer of the present invention is not restricted by this production method.

The copolymer of the present invention can be readily produced in the presence of a catalyst comprising the solid catalytic component (A), an organic aluminum compound (B), and an electron donor compound (C), by making butene-1 and α-olefin react under gas phase polymerization conditions.

The solid catalytic component (A) is prepared in the following. Chlorinating at least one kind of organic magnesium compound shown as Mg R¹ R²

(in the formula, R¹ and R² may be the same or different, and represent respectively an alkyl group with carbon number of 1 to 20.) with at least one kind of chlorinating agent to obtain a carrier is carried out. The carrier is then put in contact with a halide of tetravalent titanium in the presence of an electron donor at a temperature in the range of −25° to +180° C. Thus, the solid catalytic component (A) is obtained.

The organic magnesium compound can be such alkyl magnesium compounds as diethyl magnesium, ethylbutyl magnesium, ethylhexyl magnesium, ethyloctyl magnesium dibutyl magnesium, butylhexyl magnesium, butyloctyl magnesium, and dicyclohexyl magnesium.

Among these, butyloctyl magnesium is preferable.

The chlorinating agent can be chlorine gas and alkyl chloride, and in the present invention, the combined use of chlorine gas and butyl chloride is preferred.

Chlorination is normally carried out at 0° to 100° C. (preferably, at 20° to 60° C., and 20° to 40° C. is particularly preferable).

By this chlorination, some of the alkyl groups bound to magnesium atom are displaced with chlorine atoms. Moreover, since at least a part of the alkyl groups remain, formation of normal crystal lattice is prevented, so that a non-layered substance with a very small crystal diameter having an appropriate surface area and hole volume is formed.

The non-layered substance thus formed is subjected to alcohol treatment, if required, and subsequently, the non-layered substance is treated with a halide of tetravalent titanium in the presence of an electron donor. Treatment with the halide of tetravalent titanium is normally effected at a temperature within the range of −25° to +180° C.

The above-described halide of tetravalent titanium can be titanium tetrahalide, titanium alkoxy-trihalide, titanium alcoxydihalide, and titanium trialkoxymonohalide. In the present invention, the use of titanium tetrachloride is particularly preferable.

The electron donor can be oxygen, nitrogen, phosphorus, or organic compounds including sulphur.

Concrete examples of this electron donor are amines, amides, ketones, nitriles, phosphines, phosphoramides, ethers, thioethers, thioesters, acid anhydrides, acid halides, acid amides, aldehydes, organic acids, and esters. Those preferred are esters, ethers, ketones, acid anhydrides etc.

Concrete examples of these compounds are ethyl benzoate, p-methoxy ethyl benzoate, p-ethoxy ethyl benzoate, methyl toluilate, di-isobutyl phthalate, benzoquinone, anhydrous benzoic acid, ethyleneglycol butyl ether, etc. Among these di-isobutyl phthalate is preferable.

For the solid catalytic component (A) thus prepared, the preferred halogen/titanium mol ratio is 3 to 200 (the particularly preferable ratio is 4 to 100), and preferred magnesium/titanium mol ratio is 1 to 90 (particularly preferable one is 5 to 70).

There are no restrictions on the above-described organic aluminium compound (B), but trialkyl aluminium is particularly preferred.

As the electron donor compound (C), the use of heterocyclic compounds represented by the following formula (2) is preferable.

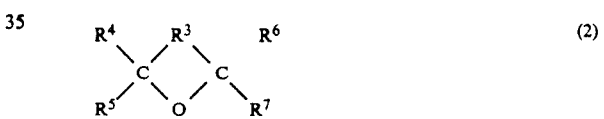  (2)

(But, in the formula, R³ and R⁶ denote hydrocarbon groups, or preferably, substituted or non-substituted, saturated or non-saturated hydrocarbon group having a carbon number 2 to 5, and R⁴, R⁵, and R⁷ denote hydrogen or hydrocarbon groups, or preferably, hydrogen or substituted or nonsubstituted, saturated or non-saturated hydrocarbon groups, having a carbon number 1 to 5 respectively.)

As the heterocyclic compounds, can be cited for example, 1,4-cineole, 1,8-cineole, m-cineole, pinole, benzofran, 2,3-hydrogenzofran (cumaron), 2H-curomen, 4H-curomen, curoman, iso-curoman, dibenzofran, xanthin, etc. Of these several kinds of heterocyclic compounds one kind may be used alone, or two kinds may be combined.

Among the above-described various kinds of heterocyclic compounds, 1,8-cineole is particularly preferable.

The composition of the catalyst used for producing the butene-1 copolymers of the present invention is made in such a way that the organic aluminium compound (B) is normally in the range of 0.1 to 1,000 times mol (preferably, 1 to 500 times mol) for the titanium atoms in the tetravalent titanium compound in the solid catalytic component (A). In, addition the electron donor compound (C) is normally used in the range of 0.1 to 500 times mol (preferably, 0.5 to 200 times mol) for the titanium atoms in the tetravalent titanium compound in the solid catalytic component (A).

The gas phase polymerization temperature is normally 45° to 80° C. (preferably, at 50° to 70° C.).

The polymerization pressure can be set appropriately in range where the substantial liquefaction of material components does not occur. In normal circumstances, the pressure is set at 1 to 15 kg/cm².

The introductory mol ratio of α-olefin and butene-1 can be set appropriately in the range of both members in the copolymer to be obtained, that is in the range of 1:99 to 35:65 (preferably, in the range of 1:99 to 30:70).

For the purpose of regulating molecular weight, a molecular weight regulating agent such as hydrogen may be present. Moreover, for the purpose of preventing coagulation, an inert gas having a lower boiling point than that of butene-1 (e.g., nitrogen, methane, ethane, and propane) can be combined.

In the present composition, it is required that a propylene copolymer comprising component (A), and a butene-1 copolymer comprising component (B) are contained in a ratio of from 25 to 97 wt. % to from 75 to 3 wt. %, preferably in a ratio of from 30 to 90 wt. % to from 70 to 10 wt. %. If the content of the propylene copolymer is lower than 25 wt. %, the molded item obtained therefrom is not high enough in mechanical properties such as rigidity, and impact resistance, and transparency, while if the content of the propylene copolymer exceeds 97 wt. %, the lowering of the heat-sealing temperature of the film obtained therefrom is not sufficient to attain the purpose of the invention.

The present composition can be prepared by blending a propylene copolymer and a butene-1 copolymer in the usual blending manner for example by using the dry blending technique, and a variety of mixers, kneaders, and extruders, for example, can be used.

The present olefin copolymer composition contains a propylene copolymer and a specific butene-1 copolymer in a prescribed ratio, and can provide films good in processability, excellent in heat-sealing properties, and good in transparency, blocking resistance, mechanical properties, and surface gloss.

EXAMPLES

The present invention is further described with reference to the following Examples, which are not meant to limit the present invention.

Incidentally, the properties of butene-1 copolymers and the properties of films were determined as follows:

(1) Intrinsic Viscosity

The intrinsic viscosity was measured in decalin at the temperature of 135° C.

(2) Molecular Weight Distribution (Mw/Mn)

The molecular distribution was measured by installing two pieces of Showdex AD807 and AD80M/S, respectively, on the GPC apparatus 150C made by Waters Co., Ltd. The temperature for measurement is 135° C.

(3) Differential scanning calorimetric analysis

The obtained butene-1 copolymer was dried to be used as a sample. The sample was heated to 0° to 200° C. at a heating rate of 10° C./min to determine the endothermic peak.

(4) Block property of comonomer

The $^{13}C$ nuclear magnetic resonance spectrum of the obtained butene-1 copolymer was determined, the triads were identified by the method described in "Macromolecules" mentioned above, and the block property was calculated according to the formula:

$X = I/O$ mentioned above.

(5) Boiling diethyl ether soluble matter

The obtained butene-1 copolymer was dried, and formed into a press sheet 1 mm in thickness, the sheet was cut into samples of 1 mm by 1 mm, and the samples were extracted with diethyl ether for 6 hours using a Soxhlet apparatus to determine the amount of soluble matter.

(6) Resin pressure

The resin pressure was measured under conditions that can Provide a film 20 μm in thickness at a haul-off speed of 7 m/min by using a T-die cast molding machine having a screw with a diameter of 20 mm.

(7) Heat-sealing strength

The faces each having the copolymer composition layer were put together, and the sheets were heat-sealed at respective temperatures under a pressure of 1.25 kg/cm² for 2 sec by a seal bar, and were allowed to cool. A test piece with a width of 15 mm was cut out from the resulting sample, and the strength required when the heat-sealed section was peeled at a crosshead speed of 200 mm/min was measured. The composite film comprising the copolymer composition was allowed to stand for a week in an air atmosphere at 50° C., and the value determined by the above method was taken as the heat-sealing strength after the heat treatment.

(8) Blocking resistance

The assessment was made in accordance with ASTM D 1893. That is, the two-layer films were cut into pieces 10 cm in width and 15 cm in length, the faces where the copolymer composition is layered were put together, and the resulting piece was sandwiched between two glass plates, and was placed in a constant temperature bath at 50° C. with a load of 10 kg placed on the glass plate. After one day and six days the samples were taken out, the peel strength was measured by a universal testing machine, and the peeling strength per 1 cm was taken as the blocking value.

(9) Haze

In accordance with JIS K 7105, the two-layer film was aged for 7 days in a constant temperature bath at 50° C., and then the cloudiness was measured.

(10) Coefficient of Statis friction

In accordance with ASTM D 1894, the two-layer film was aged for 7 days in a constant temperature bath at 50° C., and the coefficient of static friction was measured.

PREPARATION EXAMPLES 1 TO 6

(1) Preparation of Said Catalytic Component (A)

Three hundred ml of butyloctyl magnesium (20%. heptane solution) were put in a five-mouthed flask equipped with a mechanical stirrer, a reflux condenser, a dropping funnel, a gas supply valve, and a thermometer, and nitrogen was introduced into the flask to maintain an inert atmosphere in the flask. Then, 5 ml of butyl chloride was added into the flask at room temperature using the dropping funnel. subsequently, chlorine gas was added at a rate of 5 ml/min. to start chlorination.

Next, at 25° to 35° C., 2.5 l of silicone oil was added, and further, 113 ml of ethanol was added dropwise into this mixture. The chlorinated substance formed was precipitated by the addition of ethanol. The mixed solution including this precipitate was stirred for one hour at 40° C. and subsequently the temperature was raised to between 75 and 80° C., and the solution was left stand at this temperature over-night.

This high temperature solution was added gently to a solution cooled to $-25°$ C. and including di-isobutyl phthalate (electron donor) and the excess $TiCl_4$ by means of a siphon, to precipitate the reaction's intermediate product in this low temperature $TiCl_4$. Then, the mixed solution including this precipitate was heated to room temperature.

Next, to the mixed solution including this precipitate was further added di-isobutyl phthalate as an electron donor, and the temperature was raised to 100° to 110° C., and the mixed solution was kept at this temperature for one hour. The reaction product was precipitated, and washed 5 to 6 times with pentane at 85° C. The solution was transferred to another vessel by means of a siphon.

Furthermore, excess $TiCl_4$ was added to this solution, and the mixture was stirred at 110° C. for one hour. After separating the precipitate that formed and the solution with the siphon, the catalytic component that formed (precipitate) was washed with heptane several times (5 to 6 times at 80° C.).

The precipitate obtained was assembled an dried under a weak reduced pressure. Thus, the solid catalytic component (A) with Ti content of 3.0% by weight could be obtained.

(2) Preparation of Catalyst

The solid catalytic component obtained in the above-described paragraph (1) was put into a catalyst preparation tank to make the titanium concentration become 2 millimol per 1 liter. Into this catalyst preparation tank was put 30 millimol/l of triisobutyl aluminium and 12 millimol/l of 1,8-cineole. Subsequently, propylene was put in at such a proportion to become 50 g per 1 millimol of titanium atom; then, the temperature in the catalyst preparation tank was raised to 40° C. to carry out the reaction for preparing the catalyst. After continuing the reaction for one hour, the reacted solution was filtered, and an activated catalyst was obtained.

(3) Preparation of butene-1 copolymer

A fluidized bed polymerizer having a diameter of 300 mm and a volume of 100 l was used. A Ti catalyst slurry produced by adjusting the catalyst obtained in (2) so as to have a content of 3.6 mmol/l in terms of Ti atom was charged at a flow rate of 0.15 l/hr into the polymerizer, and triisobutyl aluminum, and 1,8-cineol were also charged into the polymerizer at a flow rate of 30 mmol/hr, and a flow rate of 24 mmol/hr, respectively.

The partial pressure of butene-1, and the partial pressure of nitrogen were adjusted to 3 kg/cm², and 4 kg/cm², respectively, the partial pressure of hydrogen gas was adjusted in such a way that the intrinsic viscosity of the produced polymer might be the value as shown in Table 1, butene-1, other α-olefin, hydrogen gas, and nitrogen gas were supplied in such a way that the gas superficial velocity in a column might be 35 cm/sec, and the polymerization was carried out at a reaction temperature of 60° C.

The physical properties of the obtained copolymers are given in Table 1.

PREPARATION EXAMPLES 7 to 9

(1) Preparation of solid catalyst component 75 ml of dried heptane, 75 ml of titanium tetrabutoxide, and 10 g of anhydrous magnesium chloride were dissolved completely in a three-necked glass flask (with a thermometer, and a stirrer) having a volume of 500 ml that had been heated to dry. Then after the solution was cooled to 40° C., 15 ml of methylhydrogenepolysilixane were added to the solution to deposit magnesium chloride/titanium tetrabutoxide complex, the complex was washed with purified heptane, then 8.7 ml of silicon tetrachloride and 1.8 ml of diheptyl phthalate were added thereto, and it was kept at 50° C. for 2 hours. Thereafter, washing with purified heptane was effected to produce a solid catalyst component.

In the produced solid catalyst component, the titanium content was 3.0 wt. %, and the diheptyl phthalate content was 25.0 wt. %.

(2) Preparation of butene-1 copolymer

Butene-1 in an amount of 5 kg per hour, an α-olefin in such an amount per hour that the α-olefin unit amount might be as shown in Table 1, triethyl aluminum in an amount of 10 mmol per hour, vinyltriethoxysilane in an amount of 1 mmol per hour, and the solid catalyst obtained in (1) in an amount of 0.05 mmol per hour in terms of titanium atom were added continuously into a 20-l polymerizer, and the partial pressures of the butene-1 and other α-olefin in the gas phase were adjusted so that the intrinsic viscosity of the produced copolymer might be as shown in Table 1. The reaction temperature was kept at 70° C.

The polymerization liquid was removed continuously from the reaction vessel so that the polymerization liquid in the reaction vessel might be 10 l, a small amount of ethanol was added to the removed reaction product to terminate the polymerization reaction, and the unreacted components were removed to obtain the butene-1 copolymer.

The physical properties of the obtained copolymers are given in Table 1.

PREPARATION EXAMPLE 10, and 11

Butene-1 in an amount of 5 kg per hour, an α-olefin in such an amount per hour that the α-olefin unit amount might be as shown in Table 1, diethyl aluminum in an amount of 20 mmol per hour, and titanium trichloride (manufactured by Toho Titanium Co., Ltd.) in an amount of 10 mmol per hour were added continuously into a 20-l polymerizer, the partial pressure of the hydrogen in the gas phase was kept at 2.7 kg/cm², and the partial pressures of the butene-1 and other α-olefin in the gas phase were adjusted so that the intrinsic viscosity of the produced copolymer might be as shown in Table 1. The reaction temperature was kept at 70° C.

The Polymerization liquid was removed continuously from the reaction vessel so that the polymerization liquid in the reaction vessel might be 10 l, methanol in an amount of 1 l per hour was added to the removed reaction product to terminate the polymerization reaction, and the unreacted components were removed by washing with water to obtain the butene-1 copolymer.

The physical properties of the obtained copolymers are given in Table 1.

TABLE 1

| Preparation Example No. | Copolymer Abbreviation | Comonomer unit Type | Comonomer unit Content (mol %) | Intrinsic viscosity (dl/g) | $\overline{M}w/\overline{M}n$ | DSC Highest melting point (°C.) | Temperature difference $\Delta t$ (°C.) | Comonomer block property | Diethyl ether soluble matter content (wt %) |
|---|---|---|---|---|---|---|---|---|---|
| 1 | BE-1 | Ethylene | 1.6 | 1.95 | 5.6 | 94 | 19 | 0 | 10.4 |
| 2 | BE-2 | Ethylene | 8.6 | 2.14 | 5.6 | 81 | 29 | 0.009 | 23.5 |
| 3 | BP-1 | Propylene | 7.1 | 2.06 | 5.8 | 95.3 | 11.3 | 0.0026 | 5.2 |
| 4 | BP-2 | Propylene | 23.1 | 2.41 | 5.6 | 78.6 | 21.6 | 0.0081 | 23.5 |
| 5 | BH-1 | Hexene-1 | 2.0 | 2.18 | 5.7 | 112.3 | 10.5 | 0 | 6.8 |
| 6 | BH-2 | Hexene-1 | 7.2 | 2.14 | 5.4 | 106.2 | 16.2 | 0.001 | 13.1 |
| 7 | RBE-1 | Ethylene | 8.0 | 2.13 | 3.0 | 84 | 0 | — | — |
| 8 | RBP-1 | Propylene | 15.2 | 2.13 | 3.1 | 85 | 0 | — | — |
| 9 | RBH-1 | Hexene-1 | 9.7 | 2.13 | 3.3 | 102.1 | 0 | — | — |
| 10 | RBE-2 | Ethylene | 8.3 | 1.84 | 5.0 | 79 | 0 | 0.021 | 37.8 |
| 11 | RBP-2 | Propylene | 7.3 | 2.17 | 5.1 | 95 | 0 | 0.0113 | 19.5 |

EXAMPLES 1 to 11, AND COMPARATIVE EXAMPLES 1 to 10

Prescribed amounts of butene-1 copolymer pellets obtained in Preparation Examples, and propylene copolymer pellets or propylene homopolymer pellets were mixed for 10 min in a V-type blender, and then were charged into a first hopper. Propylene copolymer as a base material was charged into a second hopper.

By using a two-layer T-die cast molding machine having the above-mentioned first and second hoppers with the screw diameter being 20 mm, a two-layer film consisting of a base material layer having a thickness of 40 μm and a copolymer composition layer having a thickness of 10 μm was produced under such conditions that the resin temperature was 220° C. and the haul-off speed was 7 m/min. The physical properties of the film were measured and the results are shown in Table 2.

As the propylene copolymer or propylene homopolymer, the following were used.

| Propylene copolymer | MI (g/10 min) | Comonomer | Comonomer content (wt. %) |
|---|---|---|---|
| PP-1 | 8.1 | ethylene | 3.3 |
| PP-2 | 10 | ethylene | 2.4 |
| PP-3 | 12 | — | 0 |

TABLE 2

| | Copolymer composition (A) | Copolymer composition (B) | (A)/(B) weight ratio | Base material PP | Haze (%) | Coefficient of static friction | Blocking resistance (g) | Heat-sealing strength (g/15 mm) 70° | 90° | 110° | 130° | Resin pressure (kg/cm²) |
|---|---|---|---|---|---|---|---|---|---|---|---|---|
| Example 1 | PP-1 | BE-1 | 50/50 | PP-3 | 2.3 | 0.39 | 2.8 | 60 | 740 | 1620 | 1670 | 70 |
| Example 2 | PP-1 | BE-2 | 50/50 | PP-3 | 2.4 | 0.40 | 3.2 | 210 | 1200 | 1680 | 1680 | 80 |
| Example 3 | PP-1 | BE-2 | 70/30 | PP-3 | 2.2 | 0.35 | 1.7 | 50 | 930 | 1620 | 1650 | 70 |
| Example 4 | PP-1 | BE-2 | 30/70 | PP-3 | 2.6 | 0.49 | 4.6 | 360 | 1570 | 1640 | 1660 | 90 |
| Example 5 | PP-2 | BE-2 | 50/50 | PP-3 | 2.4 | 0.39 | 3.0 | 230 | 1180 | 1670 | 1650 | 80 |
| Example 6 | PP-2 | BE-2 | 50/50 | PP-2 | 1.9 | 0.40 | 3.1 | 220 | 1150 | 1320 | 1350 | 80 |
| Example 7 | PP-1 | BP-1 | 50/50 | PP-3 | 2.4 | 0.39 | 3.0 | 80 | 840 | 1560 | 1630 | 80 |
| Example 8 | PP-1 | BP-2 | 50/50 | PP-3 | 2.8 | 0.41 | 3.5 | 320 | 1330 | 1640 | 1680 | 90 |
| Example 9 | PP-1 | BP-2 | 30/70 | PP-3 | 3.0 | 0.48 | 4.9 | 390 | 1620 | 1640 | 1630 | 100 |
| Example 10 | PP-1 | BH-1 | 50/50 | PP-3 | 2.4 | 0.40 | 3.0 | 130 | 1210 | 1610 | 1690 | 90 |
| Example 11 | PP-1 | BH-2 | 50/50 | PP-3 | 2.5 | 0.42 | 3.1 | 340 | 1570 | 1620 | 1680 | 90 |
| Comparative example 1 | PP-1 | — | 100/0 | PP-3 | 1.7 | 0.32 | 0.7 | — | — | — | 260 | 60 |
| Comparative example 2 | — | BE-2 | 0/100 | PP-3 | 5.3 | Unable to be measured | 14.2 | 540 | 1260 | 1270 | 1270 | 100 |
| Comparative example 3 | — | BP-2 | 0/100 | PP-3 | 4.8 | Unable to be measured | 11.3 | 520 | 1240 | 1260 | 1220 | 120 |
| Comparative example 4 | — | BH-2 | 0/100 | PP-3 | 5.0 | Unable to be measured | 12.1 | 560 | 1280 | 1260 | 1250 | 100 |
| Comparative example 5 | PP-1 | RBE-1 | 50/50 | PP-3 | 3.4 | 0.44 | 3.1 | 230 | 1120 | 1590 | 1630 | 130 |
| Comparative example 6 | PP-1 | RBE-2 | 50/50 | PP-3 | 6.2 | Unable to be measured | 9.8 | 150 | 650 | 860 | 980 | 70 |
| Comparative example 7 | PP-1 | RBP-1 | 50/50 | PP-3 | 3.5 | 0.46 | 3.6 | 310 | 1230 | 1580 | 1620 | 140 |
| Comparative example 8 | PP-1 | RBP-2 | 50/50 | PP-3 | 6.4 | Unable to be measured | 10.3 | 160 | 580 | 790 | 840 | 80 |
| Comparative example 9 | PP-1 | RBH-1 | 50/50 | PP-3 | 3.2 | 0.41 | 3.0 | 270 | 1420 | 1530 | 1630 | 140 |
| Comparative example 10 | PP-3 | BE-2 | 50/50 | PP-3 | 2.8 | 0.39 | 3.1 | — | 60 | 400 | 1080 | 80 |

What is claimed is:

1. An olefin copolymer composition, which olefin copolymer composition contains (A) 25 to 97 wt. % of a propylene copolymer, and (B) 75 to 3 wt. % of a butene-1 copolymer having a content of propylene unit of 1 to 35 mol %, an intrinsic viscosity of 0.9 to 7.2 dl/g measured in decalin heated to 150° C., a value of weight-average molecular weight/number-average molecular weight of 4 to 15, a temperature difference of 2° to 40° C. between the highest value and the lowest value of the melting point measured by the differential scanning calorimetric analysis, and a propylene block property of 0.01 or lower measured by the nuclear magnetic resonance spectral analysis.

2. An olefin copolymer composition, which olefin copolymer composition contains (A) 25 to 97 wt. % of a propylene copolymer, and (B) 75 to 3 wt. % of a butene-1 copolymer having a content of ethylene unit of 1 to 15 mol %, an intrinsic viscosity of 0.9 to 7.2 dl/g measured in decalin heated to 150° C., a value of weight-average molecular weight/number-average molecular weight of 4 to 15, a temperature difference of 2° to 40° C. between the highest value and the lowest value of the melting point measured by the differential scanning calorimetric analysis, and an ethylene block property of 0.015 or lower measured by the nuclear magnetic resonance spectral analysis.

3. An olefin copolymer composition as claimed in claim 2, wherein the butene-I copolymer has an ethylene unit content of 1 to 15 mol %.

4. An olefin copolymer composition, which olefin copolymer composition contains (A) 25 to 97 wt. % of a propylene copolymer, and (B) 75 to 3 wt. % of a butene-1 copolymer having a content of hexene-1 unit of 1 to 35 mol %, an intrinsic viscosity of 0.9 to 7.2 dl/g measured in decalin heated to 150° C., a value of weight-average molecular weight/number-average molecular weight of 4 to 15, a temperature difference of 2° to 40° C. between the highest value and the lowest value of the melting point measured by the differential scanning calorimetric analysis, and a hexene-1 block property of 0.005 or lower measured by the nuclear magnetic resonance spectral analysis.

5. An olefin copolymer composition as claimed in claim 3, wherein the butene-1 copolymer has a hexene-1 unit content of 1 to 20 mol %.

6. An olefin copolymer composition as claimed in claim 1, 2 or 4, characterized in that said propylene copolymer is a copolymer of ethylene with propylene.

7. An olefin copolymer composition as claimed in claim 1, 2 or 4 characterized in that said propylene copolymer is one having an ethylene unit content of 10 to 0.5 wt. %.

8. An olefin copolymer composition as claimed in claim 1, 2 or 4 characterized in that said propylene copolymer is one having an ethylene unit content of 8 to 1 wt. %.

9. An olefin copolymer composition as claimed in claim 1, 2 or 4 characterized in that said propylene copolymer is one having a melt index of 0.1 to 25 g/10 min.

10. An olefin copolymer composition as claimed in claim 1, 2 or 4 characterized in that said propylene copolymer is one having a melt index of 0.5 to 20 g/10 min.

11. An olefin copolymer composition as claimed in claim 1, 2 or 4 characterized in that said butene TM 1 copolymer is one having an intrinsic viscosity of 1.0 to 4.0 dl/g.

12. An olefin copolymer composition as claimed in claim 1, 2 or 4 characterized in that said butene-1 copolymer is one having a value of weight-average molecular weight/number-average molecular weight of 4 to 10.

13. An olefin copolymer composition as claimed in claim 1, 2 or 4 characterized in that said butene-1 copolymer is one having a temperature difference of 5° to 30° C. between the highest value and the lowest value of the melting point measured by the differential scanning calorimetric analysis.

14. An olefin copolymer composition as claimed in claim 1, 2 or 4 characterized in that said butene-1 copolymer is one wherein the melting point heat quantity measured by the differential scanning calorimetric analysis is 2 to 25 cal/g.

* * * * *